United States Patent
Halim et al.

(10) Patent No.: US 12,086,659 B2
(45) Date of Patent: Sep. 10, 2024

(54) SIGNALS TO I/O DEVICES BASED ON VIRTUAL COMPUTER MESSAGES

(71) Applicant: Hewlett-Packard Development Company, L.P., Spring, TX (US)

(72) Inventors: Irwan Halim, Spring, TX (US); Lei Man, Shanghai (CN); Kunchen Xie, Shanghai (CN)

(73) Assignee: Hewlett-Packard Development Company, L.P., Spring, TX (US)

(*) Notice: Subject to any disclaimer, the term of this patent is extended or adjusted under 35 U.S.C. 154(b) by 924 days.

(21) Appl. No.: 17/042,971

(22) PCT Filed: Apr. 27, 2018

(86) PCT No.: PCT/US2018/029856
§ 371 (c)(1),
(2) Date: Sep. 29, 2020

(87) PCT Pub. No.: WO2019/209322
PCT Pub. Date: Oct. 31, 2019

(65) Prior Publication Data
US 2021/0034405 A1    Feb. 4, 2021

(51) Int. Cl.
*G06F 9/54* (2006.01)
*G06F 9/451* (2018.01)
*G06F 13/38* (2006.01)
*G06F 9/455* (2018.01)

(52) U.S. Cl.
CPC .............. *G06F 9/542* (2013.01); *G06F 9/452* (2018.02); *G06F 9/546* (2013.01); *G06F 13/38* (2013.01); *G06F 2009/45579* (2013.01)

(58) Field of Classification Search
CPC .......... G06F 9/542; G06F 9/452; G06F 9/546; G06F 13/38; G06F 2009/45579
See application file for complete search history.

(56) References Cited

U.S. PATENT DOCUMENTS

| | | |
|---|---|---|
| 6,567,937 B1 | 5/2003 | Flores et al. |
| 8,064,934 B2 | 11/2011 | Klassen |
| 9,256,393 B2 | 2/2016 | Ivashin et al. |
| 9,324,055 B2 | 4/2016 | Shah et al. |

(Continued)

FOREIGN PATENT DOCUMENTS

| | | |
|---|---|---|
| CN | 102420846 A | 4/2012 |
| JP | 2003067095 A | 3/2003 |

*Primary Examiner* — Henry Tsai
*Assistant Examiner* — Christopher A Daley
(74) *Attorney, Agent, or Firm* — Quarles & Brady LLP

(57) ABSTRACT

A computer-readable medium may store machine-readable instructions for execution by a processor. There may be a connection between the processor and a virtual computer. The processor may establish a first data channel between the processor and the virtual computer based on the connection between the processor and the virtual computer. The connection may comprise a second data channel to transfer input/output (I/O) data between the processor and the virtual computer. The processor may receive an output message from the virtual computer via the first data channel. The processor may identify an I/O device coupled to the processor based on the output message. The processor may provide an output signal to the I/O device, the output signal based on the output message.

17 Claims, 8 Drawing Sheets

(56) References Cited

U.S. PATENT DOCUMENTS

| | | | |
|---|---|---|---|
| 9,563,581 B1 | 2/2017 | Kumar | |
| 9,705,937 B2 | 7/2017 | Hammond | |
| 9,869,984 B2 * | 1/2018 | Tsuchiya | G05B 19/0426 |
| 10,540,292 B2 * | 1/2020 | Northup | G06F 12/1027 |
| 11,435,728 B2 * | 9/2022 | Enver | G05B 19/4184 |
| 2003/0149728 A1 | 8/2003 | Wewalaarachchi et al. | |
| 2006/0149395 A1 | 7/2006 | Archacki et al. | |
| 2008/0295095 A1 | 11/2008 | Watanabe et al. | |
| 2009/0113015 A1 | 4/2009 | Koster | |
| 2011/0145819 A1 | 6/2011 | Mckenzie et al. | |
| 2011/0145821 A1 * | 6/2011 | Philipson | G06F 21/79 718/1 |
| 2012/0084381 A1 | 4/2012 | Alladi et al. | |
| 2012/0092277 A1 * | 4/2012 | Momchilov | G06F 3/041 345/173 |
| 2018/0109625 A1 | 4/2018 | Jayaraman et al. | |
| 2018/0321662 A1 * | 11/2018 | Nixon | G06F 13/4072 |
| 2019/0041824 A1 * | 2/2019 | Chavez | H04L 67/1048 |
| 2019/0138204 A1 * | 5/2019 | Halim | G06F 9/45558 |
| 2019/0370049 A1 * | 12/2019 | Gopalan | G06F 9/45558 |
| 2020/0019428 A1 * | 1/2020 | Shrey | H04W 12/06 |
| 2020/0371488 A1 * | 11/2020 | Ackmann | G05B 19/0426 |
| 2021/0034561 A1 * | 2/2021 | Halim | G06F 13/4027 |

* cited by examiner

SIGNALS TO I/O DEVICES BASED ON VIRTUAL COMPUTER MESSAGES

BACKGROUND

Virtual computers emulate a computer and may be run on a local computer or on a remote server. Input/Output (I/O) data, such as from a keyboard or mouse, may be transferred to the virtual computer in order to control the virtual computer. I/O data may be transferred from the virtual computer, such as in the form of images to be displayed on a monitor.

BRIEF DESCRIPTION OF THE DRAWINGS

Various examples will be described below referring to the following figures.

DETAILED DESCRIPTION

In one example in accordance with the present disclosure, an apparatus is provided. The apparatus comprises a non-transitory computer-readable medium storing machine-readable instructions that are, when executed by a processor, to cause the processor to: establish a first data channel between the processor and a virtual computer based on a connection between the processor and the virtual computer, the connection comprising a second data channel between the processor and the virtual computer, the second data channel to transfer input/output (I/O) data between the processor and the virtual computer; receive an output message from the virtual computer via the first data channel; identify an I/O device coupled to the processor based on the output message; and provide an output signal to the I/O device, the output signal based on the output message.

In one example in accordance with the present disclosure, a method is provided. The method comprises establishing a first data channel between a processor and a virtual computer based on a connection between the processor and the virtual computer, the connection comprising a second data channel between the processor and the virtual computer, the second data channel to transfer input/output (I/O) data between the processor and the virtual computer; receiving an output message from the virtual computer via the first data channel, the output message including a device class identifier; identifying an I/O device coupled to the processor based on the device class identifier; and providing an output signal to the I/O device, the output signal based on the output message.

In one example in accordance with the present disclosure, an apparatus is provided. The apparatus comprises a non-transitory computer-readable medium storing machine-readable instructions that are, when executed by a virtual computer, to cause the virtual computer to: establish a first data channel between the virtual computer and a processor based on a connection between the virtual computer and the processor, the connection comprising a second data channel between the virtual computer and the processor, the second data channel to transfer input/output (I/O) data between the virtual computer and the processor; detect an event at the virtual computer; and provide an output message to the processor via the first data channel based on the event.

Figure 1:
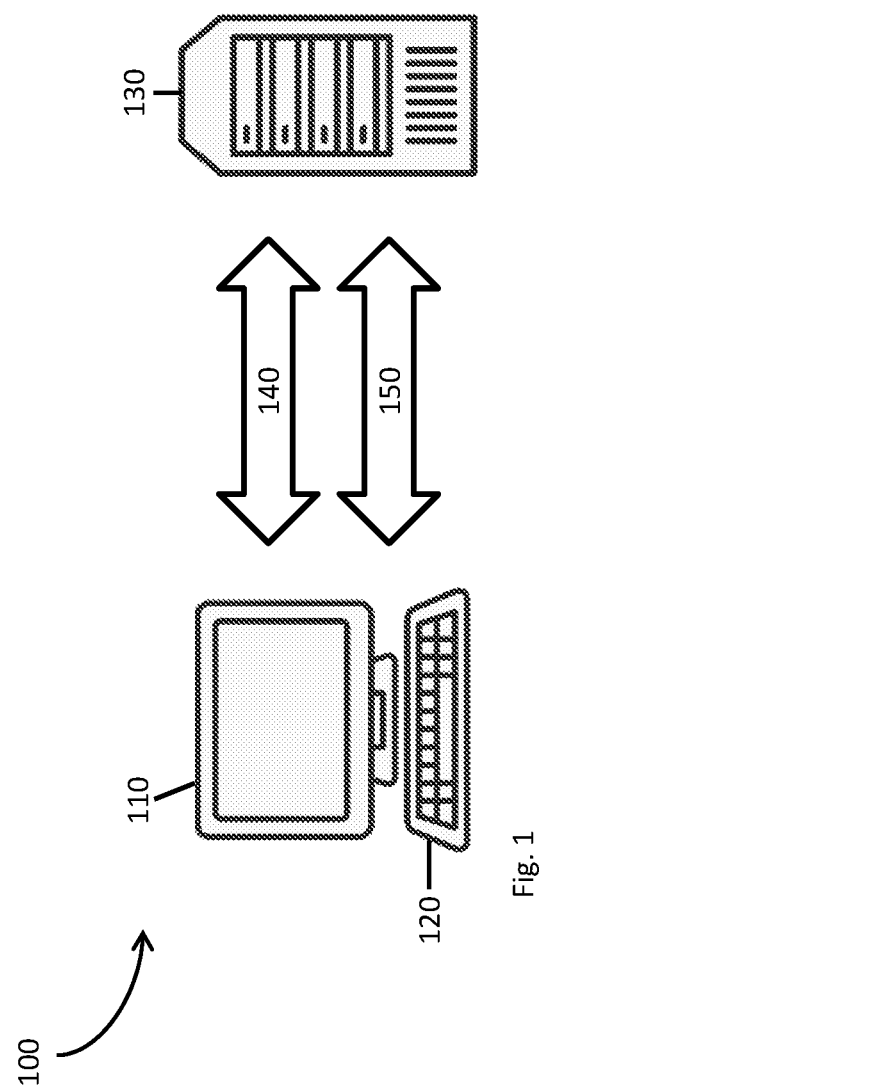
FIG. 1 shows a computer system and server to run a remote desktop in accordance with various examples.

FIG. 1 shows a computer system 110 and server 130 to run a remote desktop in accordance with various examples. Computer system 110 may include I/O devices, such as a keyboard 120. Computer system 110 may include other I/O devices, such as a mouse, trackball, microphone, camera, light pen, joystick, monitor, sound system, printer, light source, haptic device, Voice over Internet Protocol (VoIP) headset, or custom I/O device. The I/O devices may be coupled to the computer system by a Universal Serial Bus (USB), Bluetooth, or another system. The I/O devices may be removable from the computer system, such as a USB device, or built into the system, such as a button on a mobile phone or tablet. The I/O devices may comprise buttons, switches, displays, light sources, or other forms of input or output. For a display I/O device, the screen may be activated if in a power-saving mode and a graphical element may be displayed and interacted with, such as via touch for a touchscreen, or using a mouse, trackball, stylus, or similar I/O device. Server 130 may execute a virtual computer. Computer system 110 may establish a connection 140 to the virtual computer executed on server 130. Computer system 110 may, for example, access a remote desktop being run using the virtual computer on server 130. Connection 140 may include a data channel that transfers I/O data, such as I/O data from the keyboard 120. The keypresses on the keyboard 120 may be transferred over the data channel of connection 140 to the virtual computer being executed on server 130. The virtual computer may transfer images over the data channel of connection 140 to the computer system 110 to display on a monitor and sounds to be played over a speaker. Computer system 110 may be a laptop computer, desktop computer, mobile phone, tablet, or other computer system.

Computer system 110 may establish a data channel 150, based on connection 140. Data channel 150 may be called a first data channel, and the data channel of connection 140 may be called a second data channel. Data channel 150 may transfer I/O data between the computer system 110 and the virtual computer on the server 130. The I/O data transferred via data channel 150 may overlap with the I/O data transferred over the data channel of connection 140. The I/O data transferred via data channel 150 may be additional to the I/O data transferred over the data channel of connection 140. For example, pressing a key on keyboard 120, such as "Q," "J," or "Z" may cause corresponding I/O data to be transferred over the data channel of connection 140. The virtual computer on server 130 may provide an output message to computer system 110 via data channel 150 to illuminate a light source on keyboard 120, such as a light indicating the presence of new e-mails, or the output message may be to change the color or intensity of the backlight for a backlit keyboard.

Computer system 110 may comprise an application to interface with the I/O device and data channel 150. Used herein, an application is meant to encompass programs, services, daemons, device drivers, libraries, executables, and other sets of machine-readable instructions. The application may detect that a connection 140 has been established between the computer system 110 and a virtual computer, such as a virtual computer executing on a server 130. Based on detection of the connection 140, the computer system 110 may establish a data channel 150 between the computer system and virtual computer. A data channel of connection 140 and data channel 150 may both transfer input and output messages corresponding to I/O devices or even to the same I/O device. The virtual computer on server 130 may comprise an application to interface with data channel 150. The virtual computer's application may detect events at the virtual computer and provide output messages to the computer system 110 via data channel 150 for interacting with I/O devices. The computer system's application may process those output messages. For example, if the application on the virtual computer detects that new e-mails are present, the application on the virtual computer may provide a corresponding output message over data channel 150. The computer system's application may receive the output message and process the output message to recognize a request to perform an I/O operation. The computer system's application may cause the computer system 110 to activate a light source, play a sound, or cause a haptic device to cause a vibration. Activating a light source may mean to turn it on, while deactivating a light source may mean to turn it off. In various examples, the virtual computer may be executed on a server 130 that is located remotely from computer system 110 or in close proximity to computer system 110. The virtual computer may be executed on the computer system 110 and the connection and data channels may operate via procedure or function calls between the various applications or exchanged through TCP/IP. The virtual computer may be a virtual machine.

Figure 2:
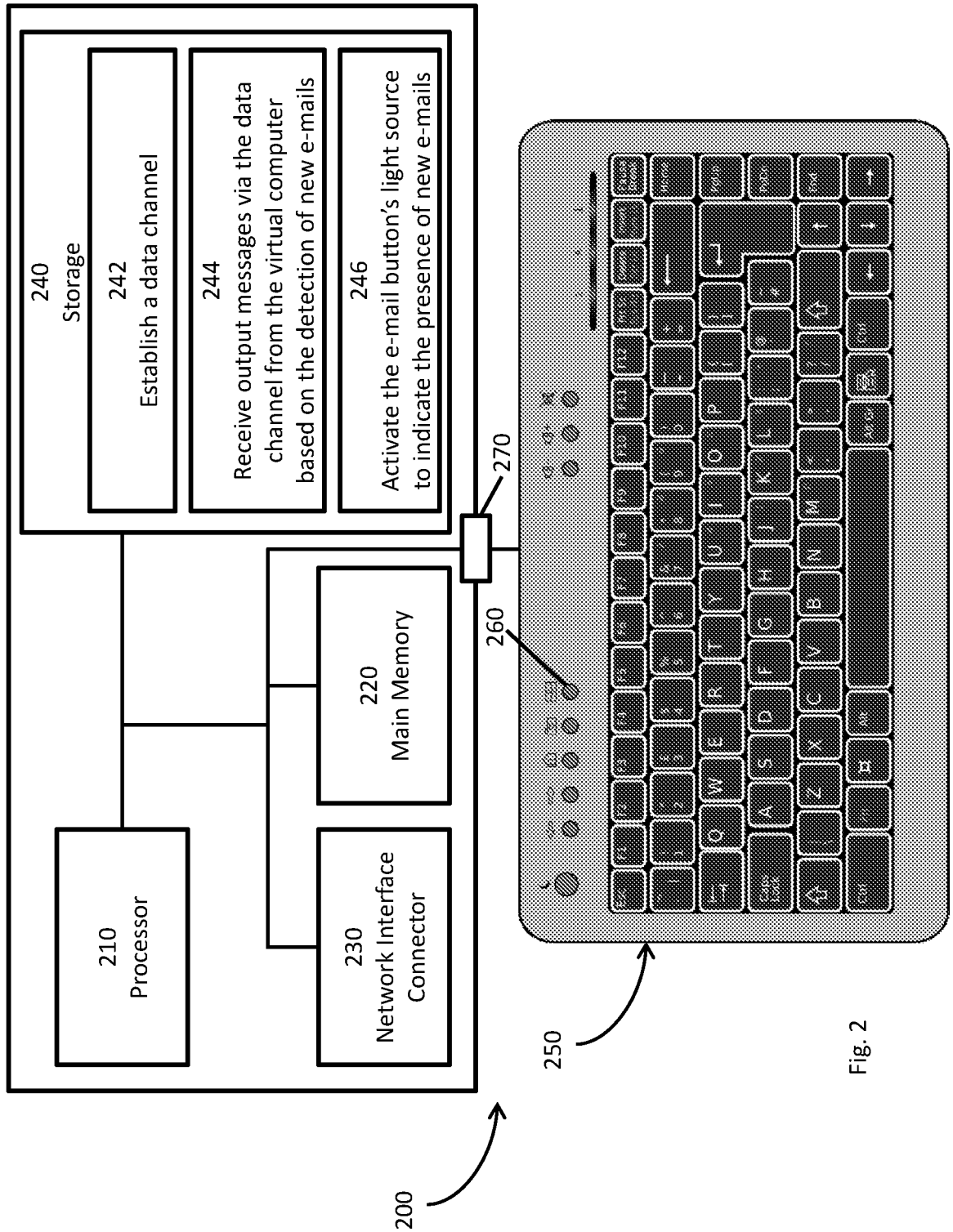
FIG. 2 shows a computer system with a keyboard in accordance with various examples.

FIG. 2 shows a computer system 200 with a keyboard 250 in accordance with various examples. Computer system 200 may comprise a processor 210, main memory 220, a network interface connector 230, storage 240, keyboard 250, and bus connector 270. Processor 210 may comprise a microprocessor, a microcomputer, a controller, a field programmable gate array (FPGA), or discrete logic to execute machine-readable instructions. Main memory 220 may comprise a random access memory (RAM), such as dynamic RAM (DRAM) or static RAM (SRAM), Flash memory, or electrically erasable programmable read only memory (EEPROM). Network interface connector 230 may comprise a network device to provide an Ethernet connection, wireless connection, or other connection. Network interface connector 230 may enable access to a private corporate network. Network interface connector 230 may enable access to the Internet. Storage 240 may comprise non-volatile or long-term storage for data or machine-readable instructions, such as a hard drive, solid state drive (SSD), Flash memory, or EEPROM. Processor 210, main memory 220, network interface connector 230, storage 240, and bus connector 270 may be coupled together, such as with a bus. Storage 240 may comprise machine-readable instructions 242, 244, 246 to be executed by processor 210. Main memory 220 may act as a cache for data transferred between storage 250 and processor 210. Processor 210 may transfer messages across a data channel via network interface connector 230.

Computer system 200 may comprise a processor 210 coupled to I/O devices, such as keyboard 250. Computer system 200 may be a server to execute a virtual computer.

Keyboard 250 may be coupled to processor 210 via the bus connector 270. The bus connector 270 may be a serial bus connector, USB connector, or other connector allowing the connection of peripherals or I/O devices to the processor 210. Keyboard 250 may include various keys representing alpha-numeric or special characters. Keyboard 250 may include an e-mail button 260 with a light source. When operating locally, computer system 200 may detect when new e-mails are present and activate the light source for the e-mail button 260. When an e-mail application is opened, the computer system 200 may deactivate the light source for the e-mail button 260. When the local computer system 200 is connected to a virtual computer, the virtual computer may not transfer a command to the computer system 200 to activate or deactivate the light source for the e-mail button 260. The command may not be transferred via the second data channel, as the connection between the local computer system 200 and the virtual computer and its second data channel may not handle such I/O commands. For example, the connection may handle I/O data such as sending back screenshots to display on a monitor, but not activating light sources, such as a light source indicating new e-mails are present. The computer system 200 may execute an application including machine-readable instructions 242, 244, 246. Machine-readable instruction 242, when executed, may cause processor 210 to establish a data channel, such as a data channel between the processor 210 and the virtual computer. Machine-readable instruction 244, when executed, may cause processor 210 to receive output messages via the data channel from the virtual computer based on the detection of new e-mails. Machine-readable instruction 244, when executed, may cause processor 210 to activate the e-mail button's light source to indicate the presence of new e-mails. For example, the computer system may process such output messages and activate or deactivate the light source for the e-mail button 260 based on the output messages from the virtual computer. The virtual computer may execute an application that detects such events and provides such output messages.

Figure 3:
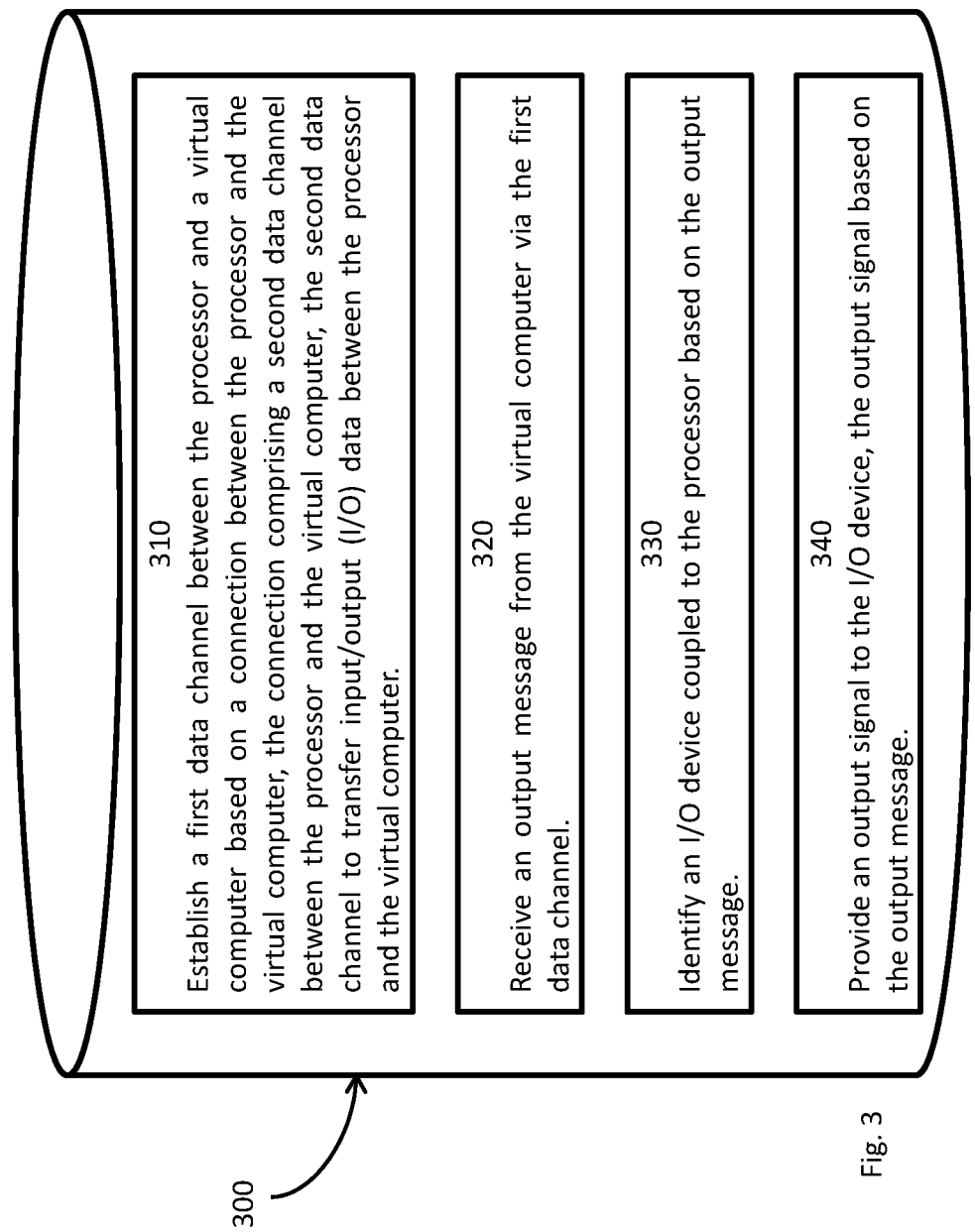
FIG. 3 shows a computer-readable medium with machine-readable instructions to be executed by a processor in accordance with various examples.

FIG. 3 shows a computer-readable medium 300 with machine-readable instructions 310, 320, 330, 340 to be executed by a processor in accordance with various examples. Computer-readable medium 300 may be storage, such as a hard drive, solid state drive (SSD), Flash memory, or EEPROM. Machine-readable instruction 310, when executed, may cause the processor to establish a first data channel between the processor and a virtual computer based on a connection between the processor and the virtual computer, the connection comprising a second data channel between the processor and the virtual computer, the second data channel to transfer input/output (I/O) data between the processor and the virtual computer. Machine-readable instruction 320, when executed, may cause the processor to receive an output message from the virtual computer via the first data channel. Machine-readable instruction 330, when executed, may cause the processor to identify an I/O device coupled to the processor based on the output message. Machine-readable instruction 340, when executed, may cause the processor to provide an output signal to the I/O device, the output signal based on the output message.

Machine-readable instructions 310, 320, 330, 340 may be part of an application to be executed by the processor. The application may detect a connection between the processor and a virtual computer. The application may detect the connection by monitoring the processes and services running on the computer system and identifying which processes or services may establish such a connection. The application may detect the connection by querying another application if a connection exists. The application may detect the connection by monitoring a notification system that provides a notification when such a connection is created. The application may detect the connection by analyzing the title bars of windows or the contents of the windows. For example, a title bar or window may include an indication of such a connection, such as "connecting to" followed by a TCP/IP address. The application may also monitor network traffic to detect the connection or determine how to connect to a remote virtual computer, such as by a particular TCP/IP address. The application may also establish the connection based on interaction with a user, such as the user specifying a TCP/IP address to connect to. In various examples, the connection between the processor and the virtual computer may allow the creation of data channels. The application may create and use a data channel through the connection.

The application may register with a device driver or other application to provide an output signal to an I/O device. The output signal may be in the form of notification of an event the I/O device is capable of handling. The application may create an output signal to provide the I/O device, based on receipt of the output message. The format of the output message may differ based on the details of the particular data channel established. The output message may comprise a device class identifier that corresponds to the I/O device, an indication of what event took place, and a timestamp indicating when the event took place. The application may process the output message to determine what action is to be performed by the I/O device. The output message may comprise the device class identifier and action to be performed by the I/O device, such as identifying a light source and an action to activate the light source. The application may be part of a device driver stack or have a corresponding component that is part of the device driver stack. The device class identifier may identify a class of devices, such as sound systems or light sources, or devices with capabilities of playing sounds or providing illumination. In various examples, the device class identifier may correspond to all devices that illuminate to indicate the presence of new e-mails, or to all devices that illuminate. The output message may comprise a device identifier. For example, the computer system may comprise multiple light sources. One light source may be to indicate the presence of new e-mails and the other to indicate whether a Voice over Internet Protocol (VoIP) call is taking place. The output message may specify which light source should activate or deactivate. One I/O device may have multiple similar or separate elements capable of output. A keyboard may include one light source to indicate the presence of new e-mails and another light source to indicate a VoIP call is taking place. The output message may include data to identify a specific element or functionality of an I/O device. An output message may include a device identifier to identify a specific I/O device.

Figure 4:
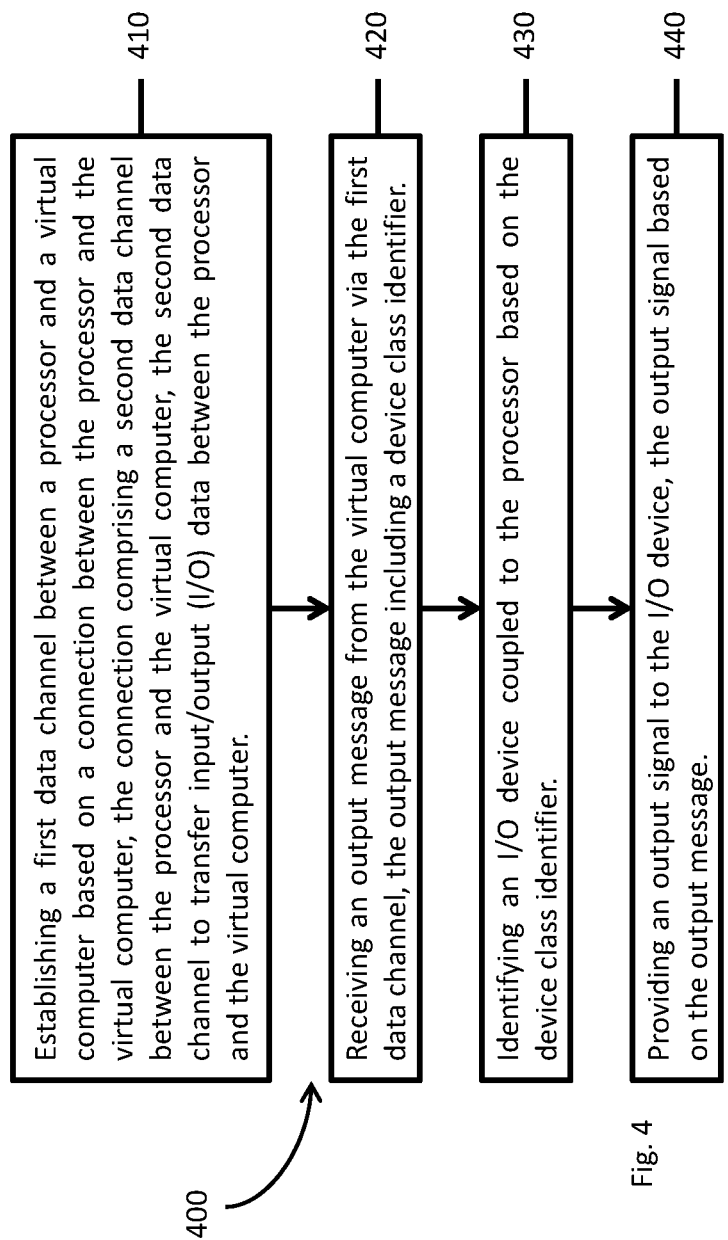
FIG. 4 shows a method of establishing and receiving data over a data channel to provide to an I/O device in accordance with various examples.

FIG. 4 shows a method 400 of establishing and receiving data over a data channel to provide to an I/O device in accordance with various examples. Method 400 may comprise establishing a first data channel between a processor and a virtual computer based on a connection between the processor and the virtual computer, the connection comprising a second data channel between the processor and the virtual computer, the second data channel to transfer input/output (I/O) data between the processor and the virtual computer 410. Method 400 may comprise receiving an output message from the virtual computer via the first data channel, the output message including a device class identifier 420. Method 400 may comprise identifying an I/O device coupled to the processor based on the device class identifier 430. Method 400 may comprise providing an output signal to the I/O device, the output signal based on the output message 440.

Figure 5:
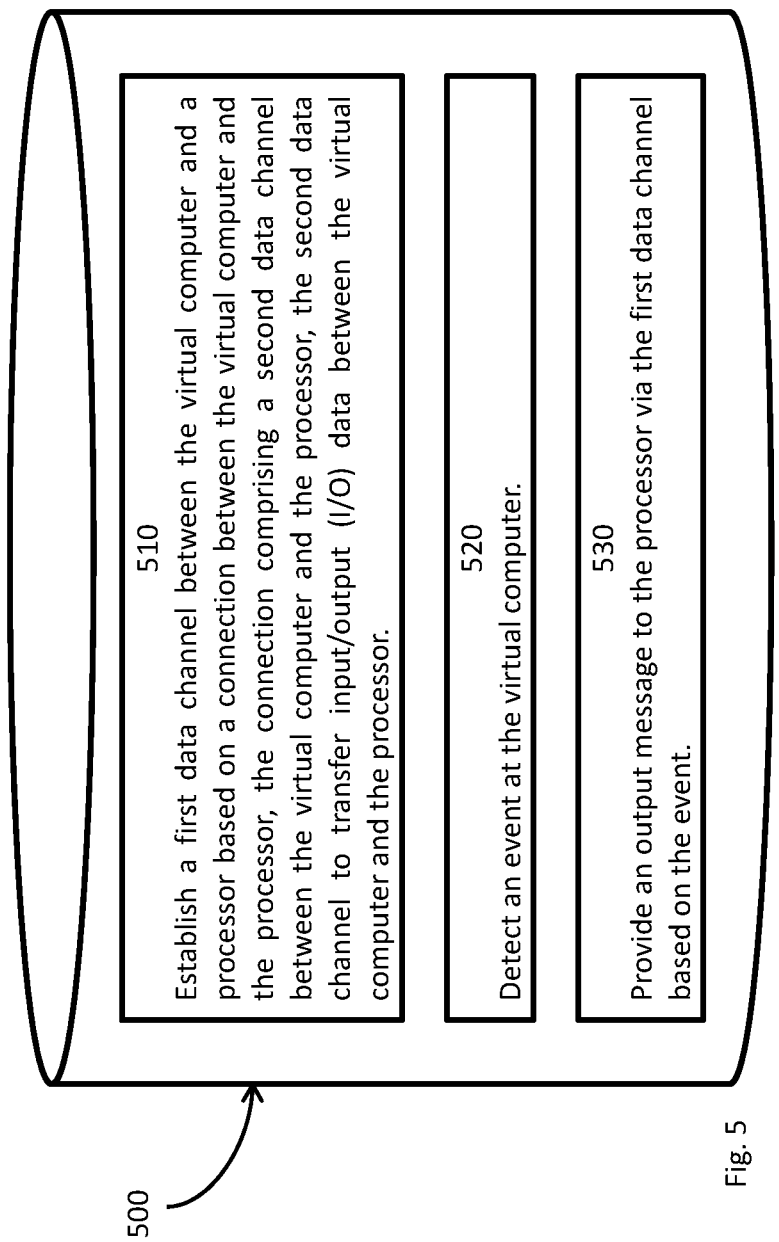
FIG. 5 shows a computer-readable medium with machine-readable instructions to be executed by a virtual computer in accordance with various examples.

FIG. 5 shows a computer-readable medium 500 with machine-readable instructions 510, 520, 530 to be executed by a virtual computer in accordance with various examples. Machine-readable instruction 510, when executed, may cause the virtual computer to establish a first data channel between the virtual computer and a processor based on a connection between the virtual computer and the processor, the connection comprising a second data channel between the virtual computer and the processor, the second data channel to transfer input/output (I/O) data between the virtual computer and the processor. Machine-readable instruction 520, when executed, may cause the virtual computer to detect an event at the virtual computer. Machine-readable instruction 530, when executed, may cause the virtual computer to provide an output message to the processor via the first data channel based on the event.

The machine-readable instructions 510, 520, 530 may be part of an application to be executed by the virtual computer. To establish the first data channel, the application may monitor communications between the virtual computer and the processor, waiting for a request from the processor to establish the connection. The application on the virtual computer may initiate the connection request.

In detecting an event, the application at the virtual computer may register for event notifications from the operating system or an application. For example, the application at the virtual computer may register with an e-mail application to receive notifications such as when new e-mails are present. The application may register with a VoIP application to receive notifications when a call is incoming or when a call ends. The application may register with an application to receive notifications when a new news article or video is available on a news or video feed. The application may register with the operating system to receive notifications when high priority updates are available. The application may register with an individual application or may register with an event service available on the virtual computer. The event service may aggregate notifications from multiple sources.

The application at the virtual computer may detect an event by analyzing the user interface similar to user interface automation. For example, the graphical user interface may be analyzed to determine which application windows are open and what is occurring. The application at the virtual computer may recognize a window as corresponding to a VoIP application and identify an interface object that indicates when a call is incoming. The application at the virtual computer may analyze the appearance of that interface object to determine if an event is occurring, such as an interface object indicating a call is incoming.

Figure 6:
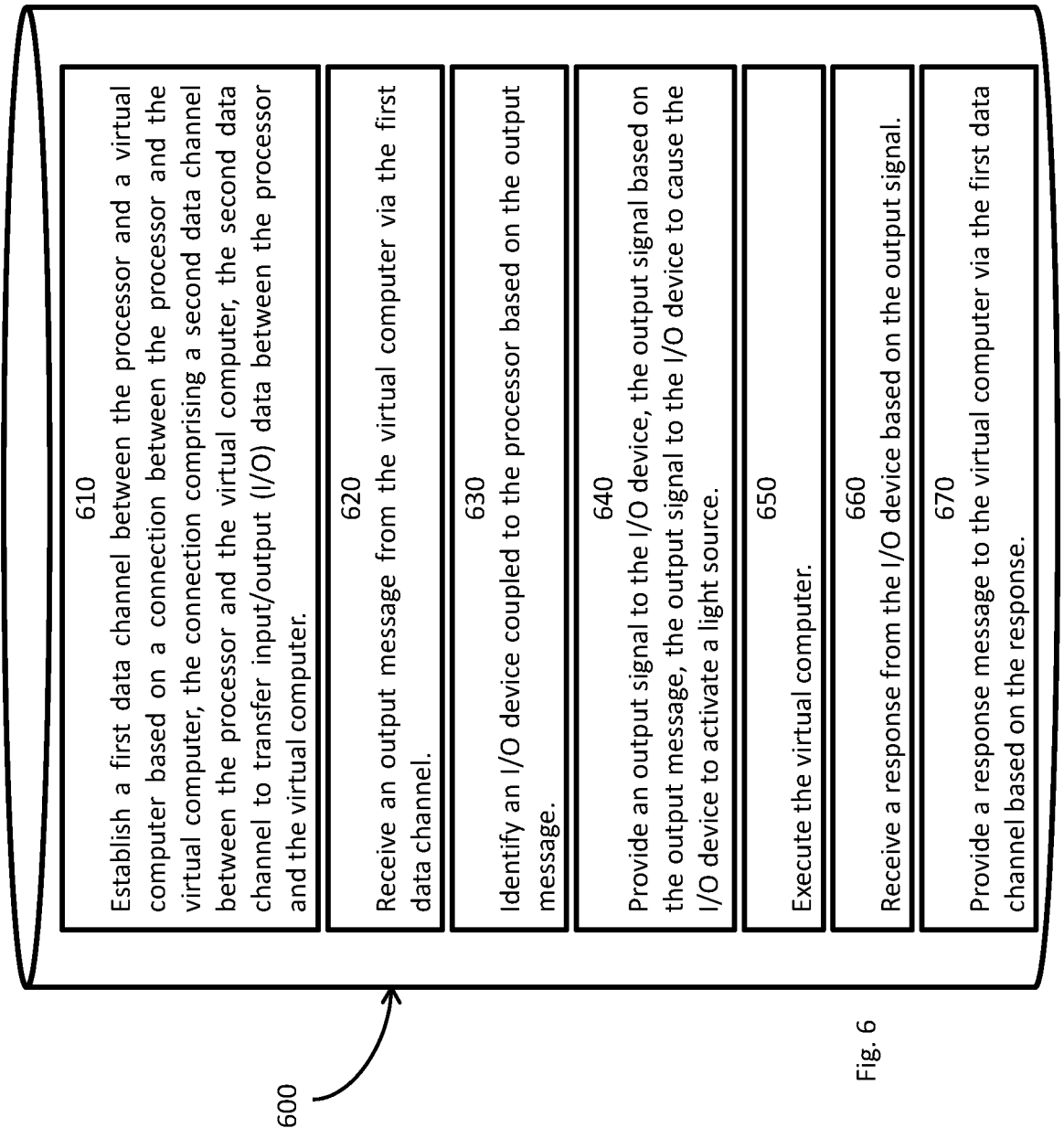
FIG. 6 shows a computer-readable medium with machine-readable instructions to be executed by a processor in accordance with various examples.

FIG. 6 shows a computer-readable medium 600 with machine-readable instructions 610, 620, 630, 640, 650, 660, 670 to be executed by a processor in accordance with various examples. Machine-readable instruction 610, when executed, may cause the processor to establish a first data channel between the processor and a virtual computer based on a connection between the processor and the virtual computer, the connection comprising a second data channel between the processor and the virtual computer, the second data channel to transfer input/output (I/O) data between the processor and the virtual computer. Machine-readable instruction 620, when executed, may cause the processor to receive an output message from the virtual computer via the first data channel. Machine-readable instruction 630, when executed, may cause the processor to identify an I/O device coupled to the processor based on the output message. Machine-readable instruction 640, when executed, may cause the processor to provide an output signal to the I/O device, the output signal based on the output message, the output signal to the I/O device to cause the I/O device to activate a light source. Machine-readable instruction 650, when executed, may cause the processor to execute the virtual computer. Machine-readable instruction 660, when executed, may cause the processor to receive a response from the I/O device based on the output signal. Machine-readable instruction 670, when executed, may cause the processor to provide a response message to the virtual computer via the first data channel based on the response.

In various examples, the virtual computer may be executed on the processor, rather than on a remote server. The data channels may comprise function or procedure calls on the virtual computer for passing data between the processor and the virtual computer being executed by the processor.

Figure 7:
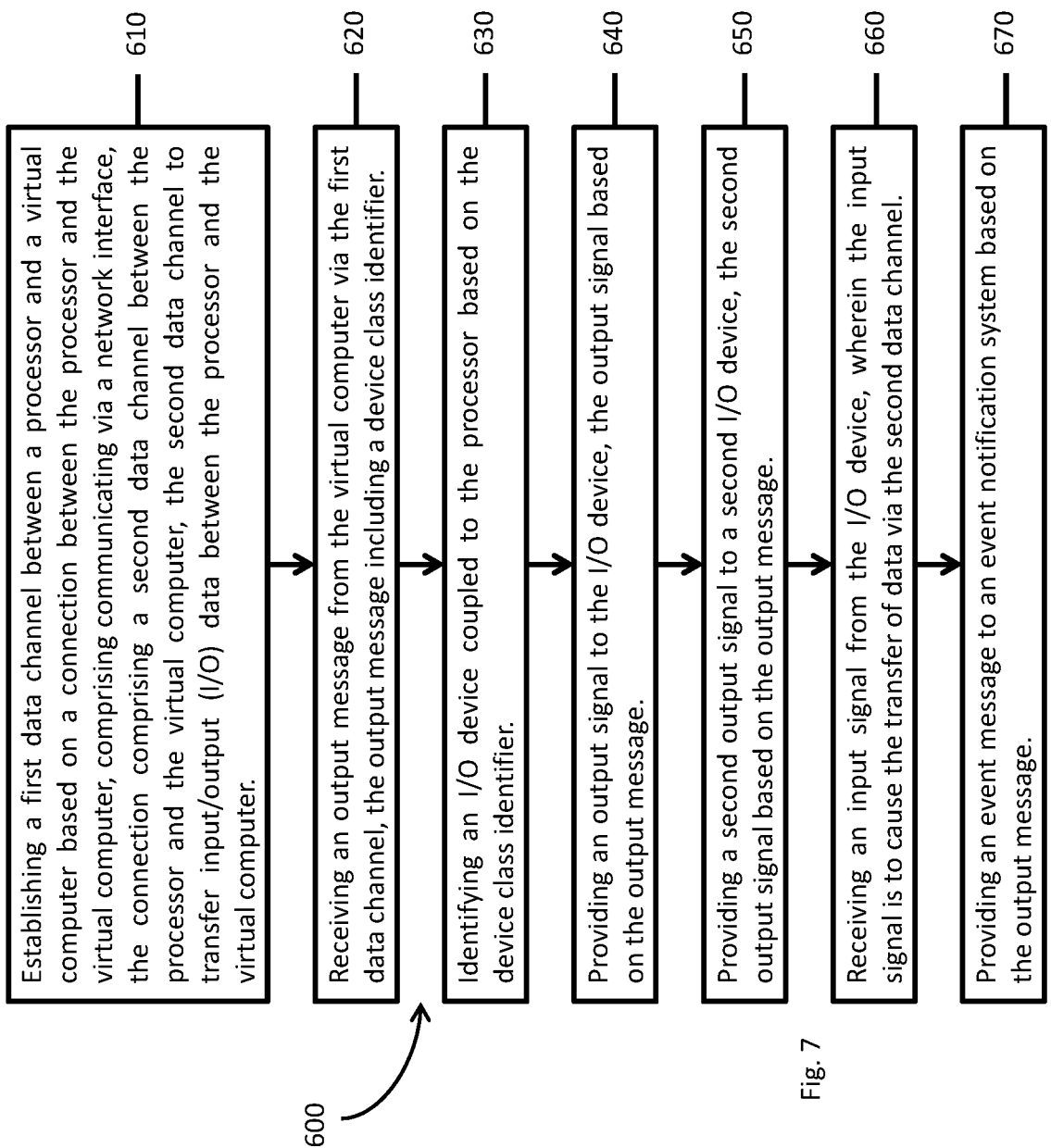
FIG. 7 shows a method of establishing and receiving data over a data channel to provide to an I/O device in accordance with various examples.

FIG. 7 shows a method 700 of establishing and receiving data over a data channel to provide to an I/O device in accordance with various examples. Method 700 may comprise establishing a first data channel between a processor and a virtual computer based on a connection between the processor and the virtual computer, comprising communicating via a network interface, the connection comprising a second data channel between the processor and the virtual computer, the second data channel to transfer input/output (I/O) data between the processor and the virtual computer 710. Method 700 may comprise receiving an output message from the virtual computer via the first data channel, the output message including a device class identifier 720. Method 700 may comprise identifying an I/O device coupled to the processor based on the device class identifier 730. Method 700 may comprise providing an output signal to the I/O device, the output signal based on the output message 740. Method 700 may comprise providing a second output signal to a second I/O device, the second output signal based on the output message 750. Method 700 may comprise receiving an input signal from the I/O device, wherein the input signal is to cause the transfer of data via the second data channel 760. Method 700 may comprise providing an event message to an event notification system based on the output message 770.

The connection may comprise both the first data channel and the second data channel. The connection may be established first. The second data channel may be established as part of or after establishing the connection. The first data channel may be established later, after detecting the connection. The first data channel may be established by using functionality of the connection to establish the first data channel. For example, the connection may make use of a remote desktop application, which may allow the creation of virtual channels for the transfer of data. The first data channel may be established by creating a virtual channel through the remote desktop application.

The processor may send a response to the virtual computer after receiving an output message. The response may be an acknowledgement of receipt of the output message or a status on successful, or unsuccessful, handling of the output message, along with an error message. If such acknowledgement is not received, the virtual computer may provide the output message to the processor another time. If the response indicates an error, the virtual computer may record an error message to an error log.

The output message may cause actions to be taken with regards to multiple I/O devices. For example, if the output message indicates new e-mails are present, the processor may cause the light source for an e-mail button on a keyboard to activate and also play a sound, such as chimes, over a sound system. The output message may specify that both actions are to be taken. In various examples, the output message may indicate that new e-mails are present and the application executed by the processor may process the output message and determine that output signals should be provided to multiple I/O devices.

The application executed by the processor may cause an event notification based on the output message. For example, the processor may provide event notifications when a VoIP call is incoming. Other applications, such as a call logging application, may register to be notified of such events. The application may provide notifications of such events to registered applications or provide notifications to an event system that aggregates and provides event notifications.

In various examples, the receipt of an output message may cause the receipt of an input signal from the I/O device and the transfer of data via the second data channel. For example, the processor may receive an output message via the first data channel of an incoming VoIP call. The processor may cause a sound to be played and a light source to activate. A user may press a button to accept the VoIP call, causing the I/O device to provide a signal to the processor. The processor may provide an input message via the first data channel to accept the VoIP call. The processor and virtual computer may use the second data channel to transfer the voice signals for the VoIP call, as well as a video signal. The processor and virtual computer may use a third data channel to transfer the voice signals for the VoIP call, as well as a video signal.

Figure 8:
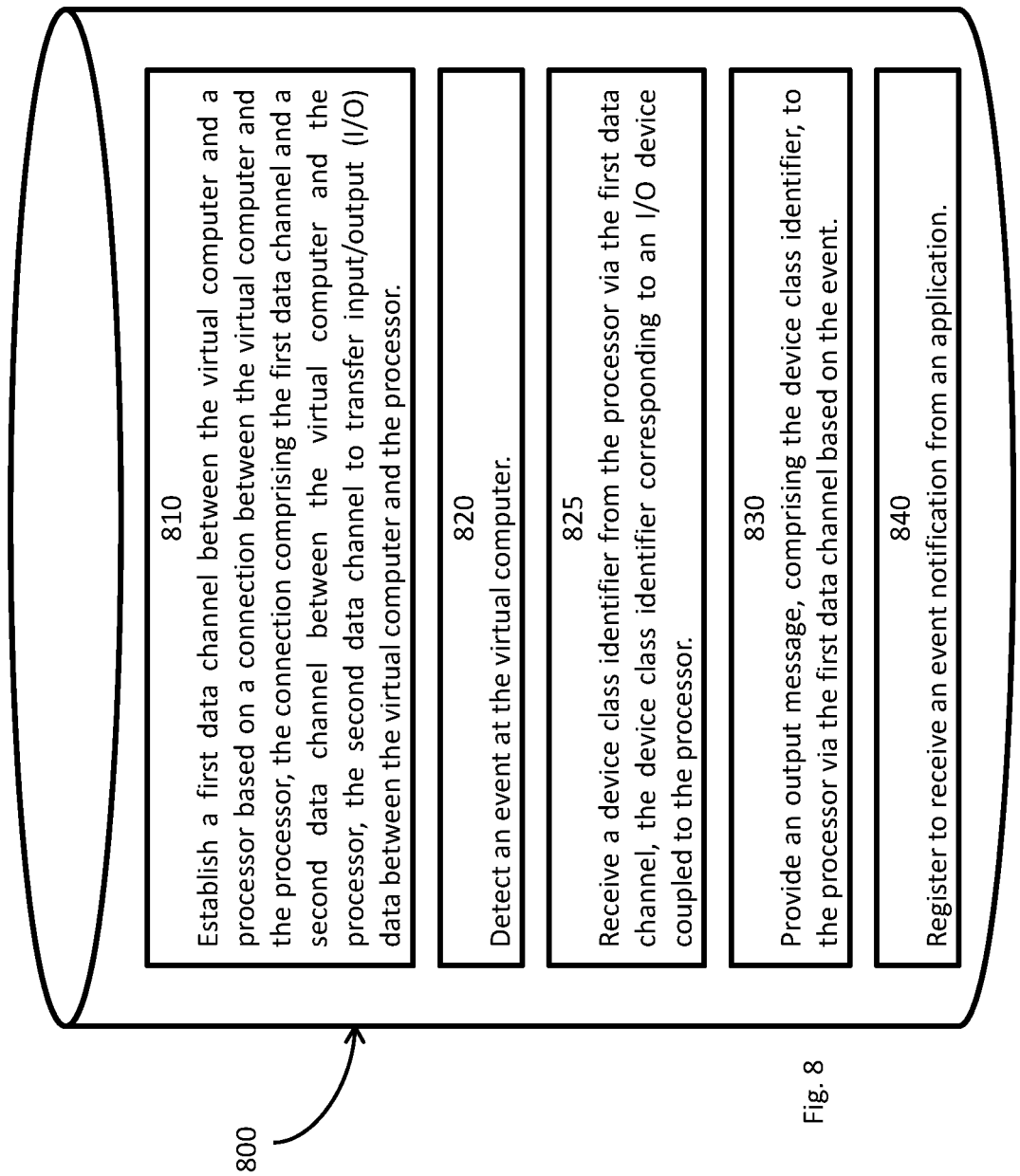
FIG. 8 shows a computer-readable medium with machine-readable instructions to be executed by a virtual computer in accordance with various examples.

FIG. 8 shows a computer-readable medium 800 with machine-readable instructions 810, 820, 825, 830, 840 to be executed by a virtual computer in accordance with various examples. Machine-readable instruction 810, when executed, may cause the virtual computer to establish a first data channel between the virtual computer and a processor based on a connection between the virtual computer and the processor, the connection comprising the first data channel and a second data channel between the virtual computer and the processor, the second data channel to transfer input/output (I/O) data between the virtual computer and the processor. Machine-readable instruction 820, when executed, may cause the virtual computer to detect an event at the virtual computer. Machine-readable instruction 825, when executed, may cause the virtual computer to receive a device class identifier from the processor via the first data channel, the device class identifier corresponding to an I/O device coupled to the processor. Machine-readable instruction 830, when executed, may cause the virtual computer to provide an output message, comprising the device class identifier, to the processor via the first data channel based on the event. Machine-readable instruction 840, when executed, may cause the virtual computer to register to receive an event notification from an application.

The virtual computer may have an event notification system for notifying applications of system events or events from other applications. Events may include session shutdown, opening or closing an application, a switch of window focus, availability of new e-mails, an incoming VoIP call, starting or ending of a VoIP call, or various other events. Individual applications may have an event notification system. The virtual computer may execute an application that monitors applications, even if the applications do not have an event notification system. For example, the virtual computer may monitor network traffic associated with an application to determine occurrence of an event, such as starting or ending a VoIP call. The virtual computer may analyze the UI to detect when a new video or news article is added to web page displaying recent videos or news articles.

The processor may provide the virtual computer with a set of the processor's accessible I/O devices. For example, the processor may indicate it has a keyboard with a light source to indicate new e-mails are present, a haptic device that may vibrate, a sound system for headphones, and a sound system for speakers. The virtual computer may send output messages intended for specific devices. The processor may indicate I/O device classes or I/O device functionality. For example, the processor may indicate it has capability to play sounds, but not identify how many sound systems. The processor may indicate it has a light source to indicate the presence of new e-mails, but not indicate it corresponds to any particular I/O device.

In various examples, the processor may change its interaction with the I/O devices based on an output message and other factors. For example, the output message may indicate a new e-mail is present. If a sound system is being used for a VoIP call, playing music, or playing a video, the processor may decide to activate or flicker a light source. If the sound system is not being used for a VoIP call, playing music, or playing a video, the sound system may play a chime sound. If the user has set the computer system to quiet mode, the processor may cause a haptic device to vibrate instead of playing a sound.

In various examples, the connection to the virtual computer may be a connection to a remote desktop running on a remote server. The local computer system may have multiple windows open, and the remote desktop window may not have focus. The processor may receive output messages while the remote desktop window does not have focus and provide output signals to I/O devices. The processor may cause the remote desktop window to get focus, bringing it to the forefront of the local user interface. The virtual computer may bring a window corresponding to an event to the forefront of its user interface and give that window focus. The processor may not send output signals to I/O devices based on output messages from the virtual computer, when the remote desktop window does not have focus, or the processor may send certain output signals to I/O devices.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A non-transitory computer-readable medium storing machine-readable instructions that are, when executed by a processor, to cause the processor to:
    establish a first data channel between the processor and a virtual computer responsive to detection of a connection between the processor and the virtual computer, the connection comprising a second data channel between the processor and the virtual computer, the second data channel to transfer input/output (I/O) data between the processor and the virtual computer, the first data channel established as part of the connection such that the connection includes the first data channel and the second data channel;
    receive an output message from the virtual computer via the first data channel;
    identify an I/O device coupled to the processor based on the output message; and
    provide an output signal to the I/O device, the output signal based on the output message.

2. The non-transitory computer-readable medium of claim 1, wherein the output signal to the I/O device is to cause the I/O device to activate a light source.

3. The non-transitory computer-readable medium of claim 2, wherein the I/O device comprises a keyboard.

4. The non-transitory computer-readable medium of claim 1, wherein the processor is to execute the virtual computer.

5. The non-transitory computer-readable medium of claim 1, wherein the machine-readable instructions are, when executed by the processor, to cause the processor to:
    receive a response from the I/O device based on the output signal; and
    provide a response message to the virtual computer via the first data channel based on the response.

6. The non-transitory computer-readable medium of claim 1, wherein the output message includes an indication of an action to be performed by the I/O device, wherein the I/O device is configured to perform the action responsive to receipt of the output signal.

7. The non-transitory computer-readable medium of claim 6, wherein the output message identifies an element of the I/O device to perform the action, wherein the I/O device is configured to perform the action using the element of the I/O device responsive to receipt of the output signal.

8. The non-transitory computer-readable medium of claim 1, wherein the first data channel is established after the second data channel is established.

9. A method comprising:
    establishing a first data channel between a processor and a virtual computer responsive to detection of a connection between the processor and the virtual computer, the connection comprising a second data channel between the processor and the virtual computer, the second data channel to transfer input/output (I/O) data between the processor and the virtual computer, the first data channel established as part of the connection such that the connection includes the first data channel and the second data channel;
    receiving an output message from the virtual computer via the first data channel, the output message including a device class identifier identifying a class of devices;
    identifying an I/O device coupled to the processor based on the device class identifier, wherein the I/O device is included in the class of devices; and
    providing an output signal to the I/O device, the output signal based on the output message.

10. The method of claim 9, further comprising providing a second output signal to a second I/O device, the second output signal based on the output message.

11. The method of claim 9, further comprising receiving an input signal from the I/O device, wherein the input signal is to cause the transfer of data via the second data channel.

12. The method of claim 9, further comprising providing an event message to an event notification system based on the output message.

13. The method of claim 9, wherein establishing the first data channel comprises communicating via a network interface.

14. A non-transitory computer-readable medium storing machine-readable instructions that are, when executed by a virtual computer, to cause the virtual computer to:
    establish a first data channel between the virtual computer and a processor responsive to detection of a connection between the virtual computer and the processor, the connection comprising a second data channel between the virtual computer and the processor, the second data channel to transfer input/output (I/O) data between the virtual computer and the processor, the first data channel established as part of the connection such that the connection includes the first data channel and the second data channel;
    detect an event at the virtual computer; and
    provide an output message to the processor via the first data channel based on the event.

15. The non-transitory computer-readable medium of claim 14, wherein the machine-readable instructions are, when executed by the virtual computer, to cause the virtual computer to register to receive an event notification from an application.

16. The non-transitory computer-readable medium of claim 14, wherein the machine-readable instructions are, when executed by the virtual computer, to cause the virtual computer to receive a device class identifier from the processor via the first data channel, the device class identifier corresponding to an I/O device coupled to the processor.

17. The non-transitory computer-readable medium of claim 16, wherein the output message comprises the device class identifier.

* * * * *